United States Patent
Henssler et al.

(10) Patent No.: US 10,393,178 B2
(45) Date of Patent: Aug. 27, 2019

(54) TILTING SEGMENT AND TILTING SEGMENT SLIDING BEARING

(71) Applicant: John Crane Bearing Technology GmbH, Goettingen (DE)

(72) Inventors: Dieter Henssler, Rettenberg (DE); Uwe Klein, Gleichen (DE)

(73) Assignee: MIBA INDUSTRIAL BEARINGS GERMANY GMBH (DE)

( * ) Notice: Subject to any disclaimer, the term of this patent is extended or adjusted under 35 U.S.C. 154(b) by 0 days.

(21) Appl. No.: 15/758,636

(22) PCT Filed: Sep. 9, 2016

(86) PCT No.: PCT/EP2016/071281
§ 371 (c)(1),
(2) Date: Mar. 8, 2018

(87) PCT Pub. No.: WO2017/042322
PCT Pub. Date: Mar. 16, 2017

(65) Prior Publication Data
US 2018/0305506 A1  Oct. 25, 2018

(30) Foreign Application Priority Data
Sep. 11, 2015 (DE) .......... 10 2015 115 385

(51) Int. Cl.
*F16C 17/03* (2006.01)
*F16C 17/06* (2006.01)
(Continued)

(52) U.S. Cl.
CPC ............. *F16C 33/201* (2013.01); *C08J 5/042* (2013.01); *F16C 17/03* (2013.01); *F16C 17/06* (2013.01);
(Continued)

(58) Field of Classification Search
CPC .......... F16C 17/03; F16C 17/06; F16C 33/12; F16C 33/121; F16C 33/201; F16C 33/28; F16C 2208/02; F16C 2208/36
See application file for complete search history.

(56) References Cited

U.S. PATENT DOCUMENTS

| 3,151,015 A | * | 9/1964 | Griffith | .................. F16C 33/20 264/241 |
| 5,518,321 A | * | 5/1996 | Hata | ..................... F16C 33/108 384/311 |

(Continued)

FOREIGN PATENT DOCUMENTS

| DE | 102005009552 | 9/2006 |
| DE | 102013201782 | 8/2014 |

(Continued)

OTHER PUBLICATIONS

Translation of International Preliminary Report on Patentability and Written Opinion for International Application No. PCT/EP2016/071281 dated Mar. 13, 2018.

(Continued)

*Primary Examiner* — James Pilkington
(74) *Attorney, Agent, or Firm* — Gerald E. Hespos; Michael J. Porco; Matthew T. Hespos

(57) ABSTRACT

A tilting segment (3, 3') for a tilting segment sliding bearing (1, 1') has a segment body (13, 13') for receiving bearing forces. The segment body (13, 13') is made of a fiber-reinforced composite material. The composite material includes a polyether ketone and carbon fibers that function as reinforcement fibers. The carbon fibers make up 25 wt. % to 70 wt. % of the fiber-reinforced composite material. Additionally, the carbon fibers form a fabric. The fabric has a contour that has an orientation that is parallel to a sliding surface (8, 18) of the segment body (13, 13').

11 Claims, 5 Drawing Sheets

(51) Int. Cl.
*F16C 33/20* (2006.01)
*F16C 33/28* (2006.01)
*C08J 5/04* (2006.01)

(52) U.S. Cl.
CPC ............ *F16C 33/28* (2013.01); *C08J 2371/00* (2013.01); *F16C 2208/02* (2013.01); *F16C 2208/36* (2013.01)

(56) References Cited

U.S. PATENT DOCUMENTS

| | | | |
|---|---|---|---|
| 5,634,725 A * | 6/1997 | Chester | ................... F16C 17/03 384/117 |
| 6,957,917 B2 | 10/2005 | Mahieux et al. | |
| 6,983,681 B2 * | 1/2006 | Iwata | ................... F04B 27/1054 92/12.2 |
| 8,119,577 B2 | 2/2012 | Stecher | |
| 9,599,150 B2 | 3/2017 | Gassmann et al. | |
| 9,732,538 B2 * | 8/2017 | Kochiyama | ............. E04H 9/021 |
| 2010/0056695 A1 | 3/2010 | Alms et al. | |
| 2013/0195388 A1 | 8/2013 | Ishii et al. | |

FOREIGN PATENT DOCUMENTS

| | | |
|---|---|---|
| EP | 1227254 | 7/2002 |
| EP | 2653736 | 10/2013 |
| JP | 58-160346 | 9/1983 |
| JP | 2003-28146 | 1/2003 |
| JP | 2003-264984 | 9/2003 |

OTHER PUBLICATIONS

International Search Report dated Nov. 24, 2016.

* cited by examiner

TILTING SEGMENT AND TILTING SEGMENT SLIDING BEARING

BACKGROUND

Field of the Invention

The invention relates to a tilting segment for a tilting segment sliding bearing having a segment body for receiving bearing forces. The segment body is made of a fiber-reinforced composite material. The invention further relates to a tilting segment sliding bearing having a plurality of tilting segments arranged on a supporting ring

Description of the Related Art

EP 2 653 736 A1 discloses a tilting segment for a tilting segment sliding bearing having a segment body for receiving bearing forces where the segment body is made of a fiber-reinforced composite material. Alternatively, it is also proposed to form the segment body from a thermoplastic polymer, especially a polyether ketone, in particular also a polyether ether ketone. It has proven to be disadvantageous that neither the known fiber-reinforced composite materials nor thermoplastic polymers, in particular polyether ketones or polyether ether ketones, have sufficient strength values and running properties.

Furthermore, DE 10 2013 201 782 A1 discloses a sliding bush for a radial sliding bearing that is made of a composite material that, in addition to polyether ether ketone (PEEK), also has potassium titanate whisker (PTW) and reinforcement fibers, preferably carbon fibers. The potassium titanate used preferably has the chemical formula $K_2Ti_6O_{13}$. The reinforcement fibers (carbon fibers) in this material should have a weight proportion between 10% and 20%.

A disadvantageous aspect of the PTW fibers is that, because their dimensions are in the micrometer range, the WHO classified them as a health hazard in 2005. Consequently, the PTW fibers should not be used.

Also in the case of this known composite material, it is disadvantageous that the strength values and running properties, in particular with respect to the formation of the segment bodies of tilting segments and their sliding properties, still need to be further improved—also with regard to harmful constituents.

JP 2003 028 146 A discloses a tilting segment for a tilting segment sliding bearing designed to absorb bearing forces. The bearing comprises a segment body having a coating made of a fiber-reinforced composite material made up of carbon fibers and a polyether ether ketone.

A disadvantage of a segment body having a sliding surface produced by coating is that the coating process is relatively complicated and costly.

Furthermore, DE 10 2005 009 552 A1 discloses a sliding or friction bearing having a coated support point, the coating of which comprises polyether ketone (PEK) or polyether ether ketone (PEEK). The coating in this case can include up to 50 percent by volume of fine particulate filler materials, e.g. carbon fibers. The coating thickness should be between 10 μm and 1000 μm.

Also in this case, it is disadvantageous that the coating process is relatively complicated and costly. In the case of coated bodies, the strength values of the body are additionally and primarily a function of the strength values of the material of the coated base body.

The present invention seeks to solve the problem of further improving the known tilting segments used in tilting segment sliding bearings, and also the tilting segment sliding bearings themselves, with respect to their strength and running properties in a cost-effective manner while avoiding harmful potassium titanate whisker (PTW).

SUMMARY

The invention relates to a tilting segment for a tilting segment sliding bearing that has a segment body for receiving bearing forces. The segment body is made of a fiber-reinforced composite material that comprises a polyether ketone. More particularly, the composite material has carbon fibers having a weight proportion of 25% to 70% as reinforcement fibers, and the carbon fibers form a fabric that has a contour-parallel orientation to the sliding surface of the segment body.

Surprisingly, it was shown that, in the case of a composite material made of polyether ketone (PEK) and carbon fibers, the tilting segments have sufficient strength values and bearing properties and, in particular, a lower wear rate, if the weight proportion of the carbon fibers is between 25% and 70%. It was further shown that the favorable sliding properties of the polyether ketone are especially effective orthogonal to the plane of the fabric. Hence, this has a positive effect on the properties of the sliding surface. As a result of the carbon fibers forming a fabric, the strength values of the entire one-piece segment body are increased.

A weight proportion of 40% to 60% carbon fibers as reinforcement fibers was found to be preferable for achieving high strengths and bearing properties. More preferably, a weight proportion of 45% to 55% carbon fibers proved favorable.

A weight proportion of 50% carbon fibers proved to be especially beneficial for the strength and bearing properties of the tilting segments. Using polyether ether ketone or polyacryletherketone instead of polyether ketone in the carbon fibers has also proven to be especially favorable.

The segment body may be formed by compression and, as a result, has a relatively high density, thereby contributing to the good strength and running properties of the sliding bearing.

The invention also relates to a tilting segment sliding bearing having the above-described tilting segments arranged on a supporting ring.

Because the supporting ring of the tilting segment sliding bearing has the above segments, the tilting segment sliding bearing also has the aforementioned features and advantages.

The tilting segments may be formed as radial tilting segments of a radial bearing and each may have a concave sliding surface. It is also possible to form the tilting segments as axial tilting segments of an axial bearing, wherein the tilting segments each have a flat sliding surface.

The running surface that faces the sliding surface may have a hard protective coating made of, for example, tungsten carbide with portions of cobalt (Co) and chromium (Cr). The tungsten carbide protective coating improves the running properties of the running surface of a rotating bearing part, for example, a shaft or a shaft washer, especially with respect to abrasion. A coating of this type based on tungsten carbide (WC) with portions of cobalt (Co) and/or chromium (Cr) can be applied in particular by High Velocity Oxygen Fuel (HVOF) spraying.

Further features and advantages of the invention can be obtained from the following specific description and from the drawings, in which examples of preferred embodiments of the invention are depicted.

DETAILED DESCRIPTION

Figure 1:
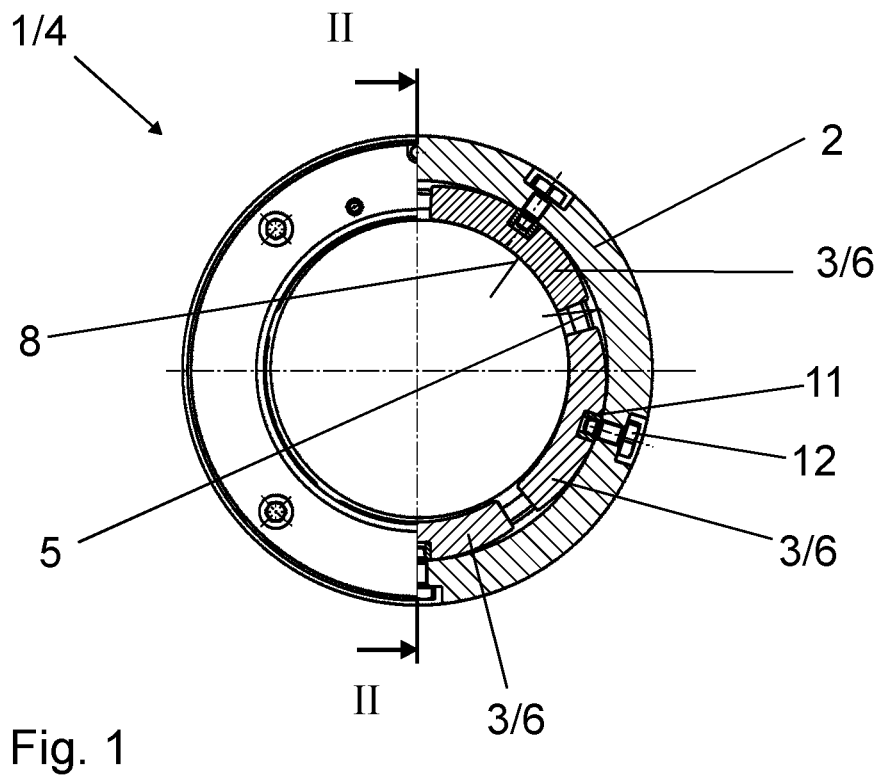
FIG. 1 is a front view in half-section of the tilting segment sliding bearing that is formed as a radial sliding bearing.
Figure 2:
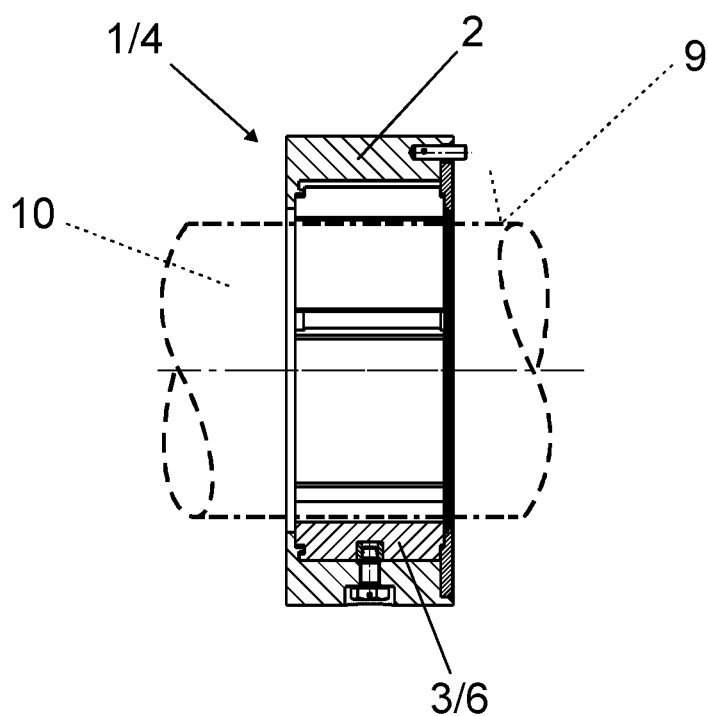
FIG. 2 is a side view of the tilting segment sliding bearing of FIG. 1 cut along the line II-II with the shaft indicated by broken lines.
Figure 3:
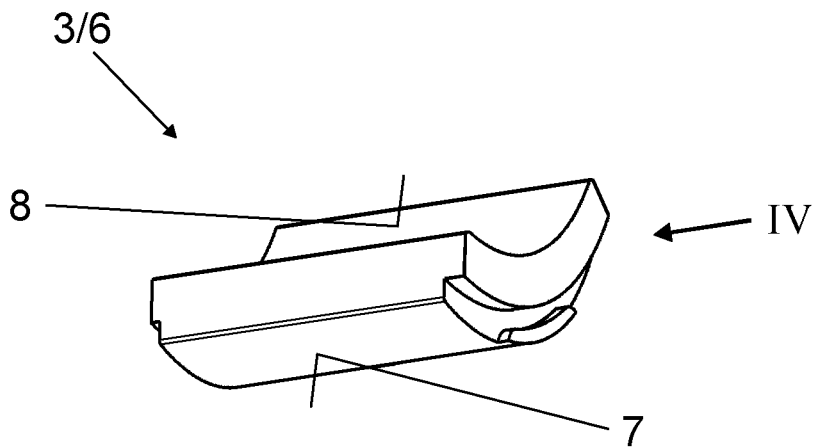
FIG. 3 is an enlarged perspective view of the tilting segment of FIG. 1 that is formed as a radial tilting segment.
Figure 4:
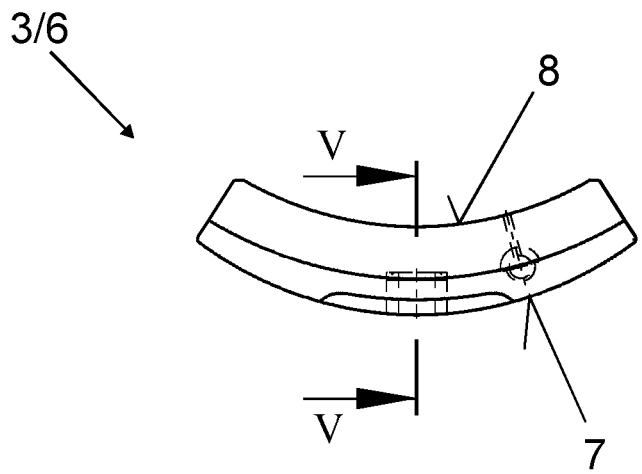
FIG. 4 is a front view of the tilting segment of FIG. 3 from the direction indicated by the arrow IV.
Figure 5:
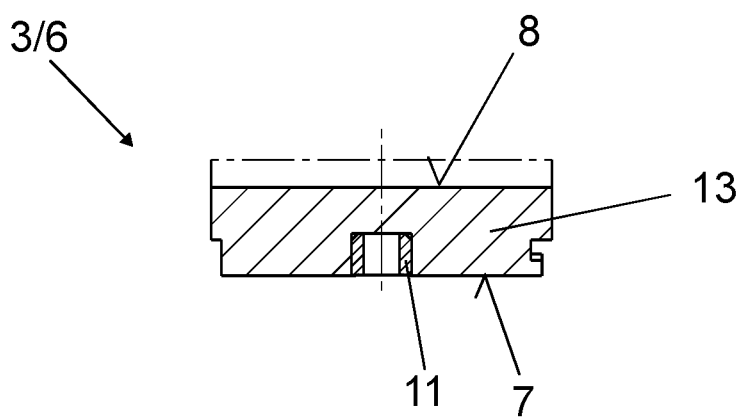
FIG. 5 is a side view of the tilting segment of FIG. 4 cut along the line V-V.

A tilting segment sliding bearing 1 is essentially made up of a supporting ring 2 and a plurality of tilting segments 3.

The tilting segment sliding bearing 1 is formed as a radial bearing 4 whose supporting ring 2 has a plurality (in the example, five) of tilting segments 3 on its inner surface 5. Accordingly, the tilting segments 3 are formed as radial tilting segments 6. The radial tilting segments 6 have an outer surface 7 facing the inner surface 5 of the supporting ring 2, wherein the radius of the outer surface 7 of the radial tilting segment 6 is smaller than the radius of the inner surface 5 of the supporting ring 2. The radial tilting segment 6 has a sliding surface 8 on the inner side facing away from the outer surface 7. The sliding surfaces 8 of the radial tilting segments 6 are in contact with the running surface 9 of a rotating shaft 10.

The radial tilting segment 6 has an element 11 by which it is attached via a screw 12 to the supporting ring 2. The element 11 provides the radial tilting segment 6 with the possibility of tilting.

The running surface 9 of the rotating shaft 10 is provided with a protective coating (not depicted in further detail) based on tungsten carbide (WC) with portions of cobalt (Co) and/or chromium (Cr).

Figure 6:
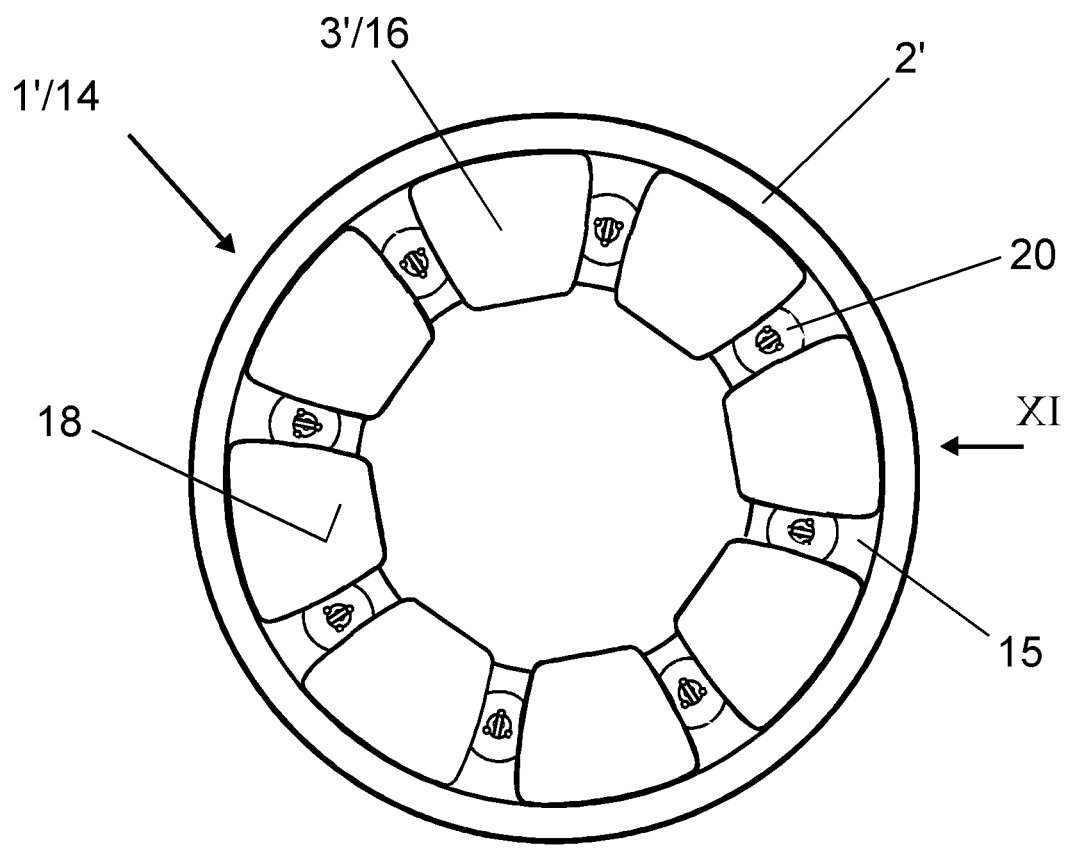
FIG. 6 is a front view of a tilting segment sliding bearing that is formed as an axial sliding bearing.
Figure 7:
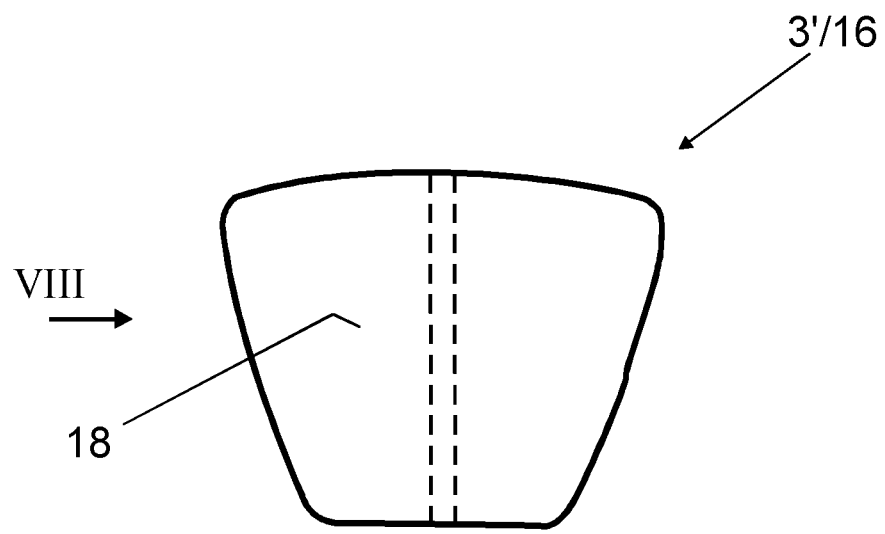
FIG. 7 is a front view in enlarged representation of the tilting segment of FIG. 6 that is formed as an axial tilting segment.
Figure 8:
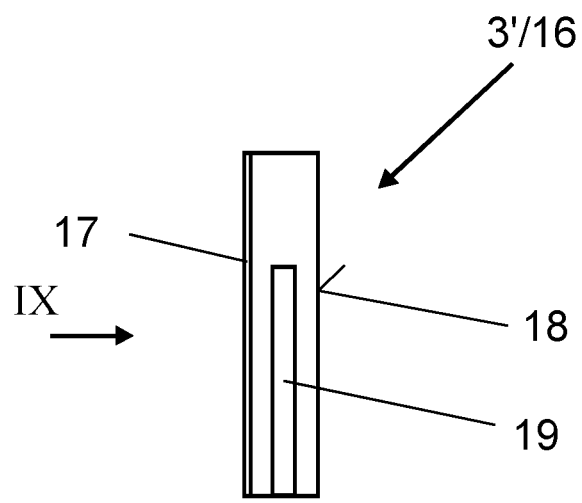
FIG. 8 is a side view of the tilting segment of FIG. 7 from the direction indicated by the arrow VIII.
Figure 9:
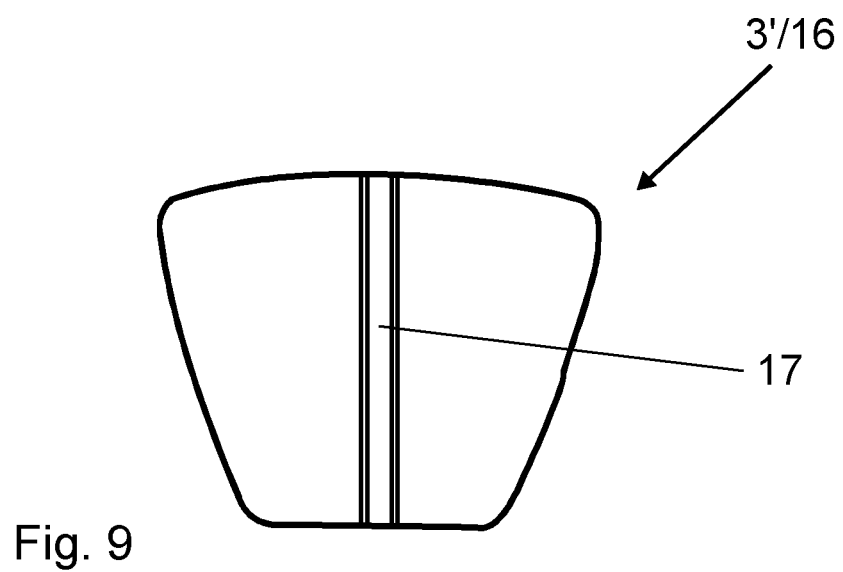
FIG. 9 is a rear view of the tilting segment of FIG. 8 from the direction indicated by the arrow IX.
Figure 10:
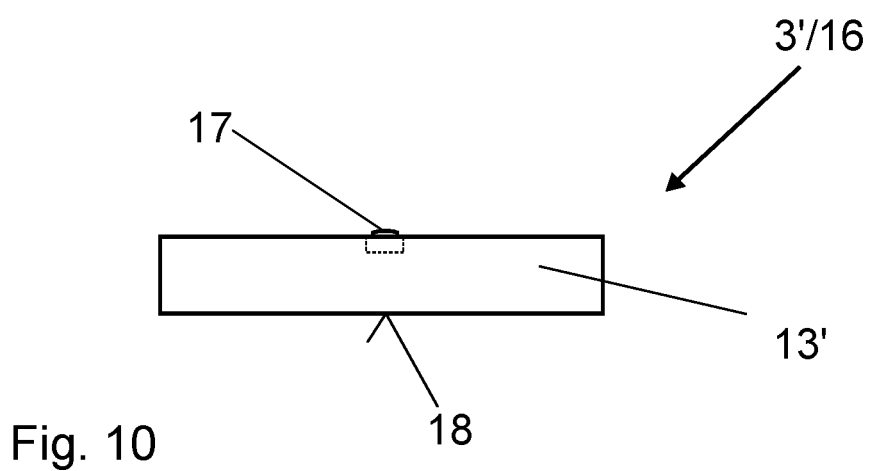
FIG. 10 is a side view of the tilting segment of FIG. 9 from the direction indicated by the arrow X.
Figure 11:
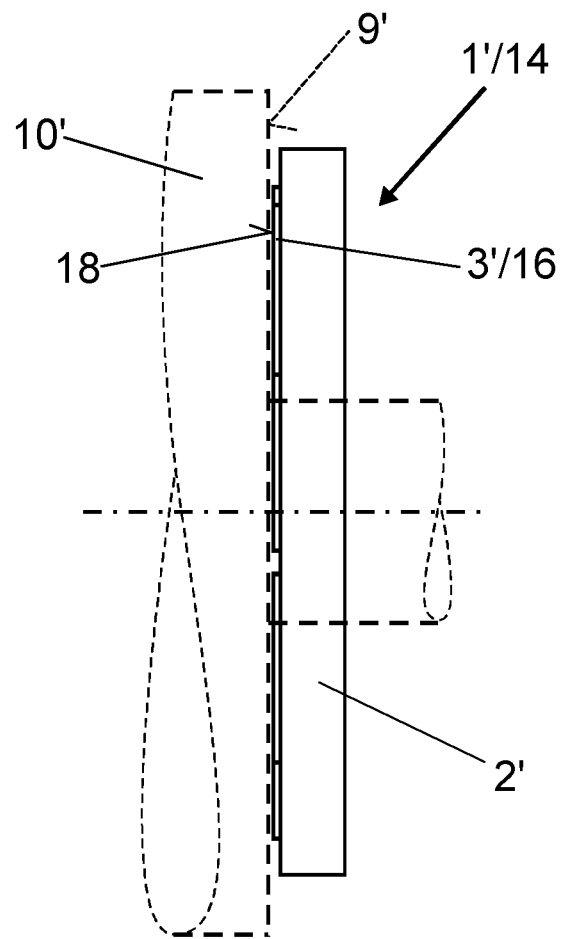
FIG. 11 is a side view of the tilting segment sliding bearing of FIG. 6 from the direction indicated by the arrow XI and having a shaft collar represented by broken lines.

The exemplary embodiment of FIG. 6 is made up of a tilting segment sliding bearing 1', a supporting ring 2' and a plurality (in the example, eight) of tilting segments 3'. The tilting segment sliding bearing 1' is formed as an axial bearing 14, wherein the supporting ring 2' has an annular rear wall against which rest the tilting segments 3' that are formed as axial tilting segments 16 having a rib 17. The axial tilting segment 16 has on its front side, which faces away from rib 17, a flat sliding surface 18 that rests against a flat running surface 9' of a rotating shaft collar 10'. The axial tilting segments 16 have lateral grooves 19 in which the locking elements 20 arranged on the rear wall 15—which forms a support for the axial tilting segments 16—engage.

The running surface 9' of the rotating shaft collar 10' is provided with a protective coating (not depicted) based on tungsten carbide (WC) with portions of cobalt (Co) and/or chromium (Cr).

The tilting segment 3, without the element 11 and the screw 12, forms the segment body 13. The tilting segment 3', without the rib 17 of the axial tilting segment 16, forms the segment body 13'.

The segment bodies 13, 13' are made of a composite material that comprises polyether ether ketone in addition to carbon fibers. The carbon fibers have a weight proportion of 50% of the composite material. The carbon fibers form a fabric that has a contour-parallel orientation with respect to the sliding surface 8, 18 of the segment body 13, 13'.

Of course, the embodiments discussed in the specific description and shown in the figures are merely illustrative exemplary embodiments of the present invention. In light of this disclosure, a person skilled in the art is given a wide range of possible variations.

LIST OF REFERENCE NUMBERS 1, 1' Tilting segment sliding bearing
2, 2' Supporting ring
3, 3' Tilting segment
4 Radial bearing
5 Inner surface of 2
6 Radial tilting segment
7 Outer surface of 6
8 Sliding surface of 6
9 Running surface of 10
9' Running surface of 10'
10 Shaft
10' Shaft collar
11 Element of 6
12 Screw
13, 13' Segment body
14 Axial bearing of 1'
15 Rear wall of 14
16 Axial tilting segment
17 Rib of 16
18 Sliding surface of 16
19 Groove of 16
20 Locking element

The invention claimed is:

1. A tilting segment (3, 3') for a tilting segment sliding bearing (1, 1') comprising:
    a segment body (13, 13') for receiving bearing forces, the segment body (13, 13') being made of a fiber-reinforced composite material;
    the composite material comprises a polyether ketone,
    the composite material has carbon fibers as reinforcing fibers of the composite material, the carbon fibers comprise 25 wt. % to 70 wt. % of the composite material, and
    the carbon fibers form a fabric, the fabric has a contour that has an orientation that is parallel to a sliding surface (8, 18) of the segment body (13, 13').

2. The tilting segment according to claim 1, wherein:
    the carbon fibers comprise 40 wt. % to 60 wt. % of the composite material.

3. The tilting segment according to claim 2, wherein:
    the carbon fibers comprise 45 wt. % to 55 wt. % of the composite material.

4. The tilting segment according to claim 3, wherein:
the carbon fibers comprise 50 wt. % of the composite material.

5. The tilting segment according to claim 1, wherein:
the polyether ether ketone is polyacryletherketone.

6. The tilting segment according to claim 1, wherein:
the segment body (13, 13') is formed by compression.

7. A tilting segment sliding bearing (1, 1') having a plurality of tilting segments (3, 3') of claim 1 arranged on a supporting ring (2, 2').

8. The tilting segment sliding bearing according to claim 7, wherein:
the tilting segments (3) are configured as radial tilting segments (6) of a radial bearing (4) and each has a concave sliding surface (8).

9. The tilting segment sliding bearing according to claim 7, wherein:
the tilting segments (3') are configured as axial tilting segments (16) of an axial bearing (14) and each has a flat sliding surface (18).

10. The tilting segment sliding bearing according to claim 7, wherein:
a rotating shaft (10) or shaft collar (10') faces the sliding surface (8, 18) and has a running surface (9, 9') with a hard protective coating.

11. The tilting segment sliding bearing according to claim 10, wherein:
the protective coating is made of a tungsten carbide and at least one of cobalt and chromium.

\* \* \* \* \*